Patented Oct. 8, 1940

2,217,615

UNITED STATES PATENT OFFICE 2,217,615

TERPENE-CYANOACYL COMPOUND AND METHOD OF PRODUCING SAME

Joseph N. Borglin, Wilmington, Del., assignor to Hercules Powder Company, Wilmington, Del., a corporation of Delaware No Drawing. Application December 27, 1939, Serial No. 311,170

15 Claims. (Cl. 260—454)

This invention relates to a new series of terpene compounds and more particularly to a new series of terpene compounds having the type formula ROOCR'XCN in which R is the terpene alcohol formed when allo-ocimene is condensed with croton-aldehyde and the condensate reduced, in which R' is an aliphatic or aromatic radical, and in which X is a member of the group consisting of sulfur, selenium, and tellurium. It also relates to a method for the preparation of these compounds.

By the method in accordance with this invention, I start with a terpene alcohol formed by condensing allo-ocimene with crotonaldehyde and subsequently reducing the condensate. I react this alcohol with a suitable halogen substituted acylating agent and then with a metal thiocyanate, a metal selenocyanate, or a metal tellurocyanate which is reactive under the conditions employed.

The reduced allo-ocimene crotonaldehyde condensate which I employ in my invention may be prepared by condensing allo-ocimene with crotonaldehyde as described in Ber. 68, 1435–8 (1935) by B. Arbusov and reducing the resulting aldehyde to an alcohol. For convenience, the terpene alcohol so produced will be referred to hereinafter as a "reduced allo-ocimene crotonaldehyde condensate." The reduction may for example be carried out conveniently by hydrogenation of the primary condensate, or treatment with sodium and alcohol, etc. The resulting alcohol may be saturated or unsaturated according to the extent of the hydrogenation. Catalytic hydrogenation of the unsaturated aldehyde may be accomplished using catalysts such as Raney nickel, or other nickel catalyst, or copper chromite. Temperatures of from about 50 to about 250° C. and pressures of from about 100 to about 5000 lbs./sq. in. may be employed. In addition to the reduction of the aldehyde group to a primary alcohol group, the use of Raney nickel catalyst causes hydrogenation of the double bonds in the remainder of the molecule and the product is thus a saturated alcohol. If copper chromite catalyst is used, it is possible to hydrogenate only the aldehyde group and the product is an unsaturated alcohol containing one or two double bonds.

The halogen substituted acylating agent which I use may be such an acid as, for example, monochloracetic acid, dichloroacetic acid, trichloroacetic acid, alpha-chloropropionic acid, beta-chloropropionic acid, alpha-chlorobutyric acid, beta-chlorobutyric acid, gamma-chlorobutyric acid, a chlorovaleric acid, a chlorocaproic acid, chlorobenzoic acid, chlorolauric acid, chloromyristic acid, chlorostearic acid, chloroleic acid, chlororicinoleic acid, chlorobehenic acid, chloroerucic acid, chloromalonic acid and chlorophthalic acid, etc., and the corresponding bromine and iodine substituted acids. Mixtures may be used if desired. Acid anhydrides or acyl halides such as, for example, as those corresponding to the acids hereinabove named are also suitable halogen substituted acylating agents.

The metal thiocyanate which I use may be any metal thiocyanate which is reactive under the conditions employed. To be reactive under the conditions employed, it must be partially or completely soluble in the reaction mixture utilized. Suitable metal thiocyanates, for example, are sodium thiocyanate, potassium thiocyanate, lithium thiocyanate, calcium thiocyanate, ammonium thiocyanate, etc. When it is desired to make the terpene selenocyanate, the metal selenocyanate I may use, may be, for example, sodium selenocyanate, potassium selenocyanate, lithium selenocyanate, ammonium selenocyanate, calcium selenocyanate, etc., and similarly, the metal tellurocyanate which I may use, may be, for example, sodium tellurocyanate, potassium tellurocyanate, lithium tellurocyanate, ammonium tellurocyanate, etc.

The reaction in accordance with this invention will desirably be carried out in two steps. The reduced allo-ocimene crotonaldehyde condensate will first be reacted with a halogen substituted acylating agent and the resulting halogenated acyl ester of the terpene compound isolated from the by-products of the reaction. Preferably, all acidic material is removed. The second stage of the reaction is the treatment of this halogenated acyl ester of the terpene compound with the metallic thiocyanate, selenocyanate, or tellurocyanate, as the case may be, followed by recovery of the product. I prefer to carry out the second step in the presence of a suitable inert solvent such as, for example, methanol, ethanol, propanol, etc., acetone, ethyl acetate, etc. Each of the steps may be carried out at any temperature within the range of about 0° C. to about 250° C., and preferably within the range of about 50° C. to about 200° C.

A halogenated acid may react with the alcohol from the allo-ocimene crotonaldehyde condensate at one or more reactive positions. It may react with a double bond where the condensate is unsaturated or it may react with a hydroxyl group. Thus, the product according to this invention may contain one or more thiocyano ester groups for each molecule of the reduced allo-ocimene crotonaldehyde condensate, and it will be appreciated that the sulfur content of the product may vary accordingly. In referring to thiocyanoacyl esters herein and in the claims, the esters mentioned include both mono and poly esters or mixtures thereof. An acyl halide or anhydride reacts only at hydroxyls and usually does not react at a double bond directly.

The halogen substituted acylates of the first stage reaction are light in color if the reaction is carried out in the absence of oxygen, for example, under a blanket of $CO_2$. Substantially water white esters may be obtained by vacuum distillation. The color of the thiocyanoacylate products follows the color of the first stage ester from which they are prepared. Where very light-colored products are desired and where it is desired to insure products of no odor or minimum odor, the first stage reaction may be conducted, if desired, in a non-oxidizing atmosphere, or the first stage product may be vacuum distilled, or both these measures may be taken.

The method in accordance with this invention will be further illustrated by the examples which will follow. All parts and percentages herein are by weight unless otherwise specified.

Example 1

A mixture of 138 parts of the saturated alcohol prepared by hydrogenation of allo-ocimene crotonaldehyde condensate and 138 parts of monochloroacetic acid was heated to a temperature of 170 to 180° C. under a blanket of carbon dioxide for 8 hours. The water formed in the reaction was allowed to distill off through an 18 inch Hempel column. The reaction was continued for an additional 8 hours at 180 to 200° C. The resulting reaction mixture was then washed with water until acid free. A yield of 148 parts of material analyzing 9.1% chlorine and containing the chloroacetate of the above alcohol, was recovered.

A mixture of 142 parts of this chloroacetate product, 80 parts of potassium thiocyanate, and 160 parts of 95% ethyl alcohol was refluxed for 12 hours. To the reaction mixture, there was added approximately 140 parts of petroleum ether. This mixture was then water washed, removing alcohol and any unreacted thiocyanate. The petroleum ether was then evaporated off at reduced pressure leaving 140 parts of product having a sulfur content of 22% and containing the thiocyanoacetate of the saturated alcohol prepared by hydrogenation of the allo-ocimene crotonaldehyde condensate.

Example 2

A mixture of 146 parts of the unsaturated alcohol prepared by the partial hydrogenation of allo-ocimene crotonaldehyde condensate and 146 parts of monochloroacetic acid was heated for 8 hours at 170 to 180° C. under a blanket of carbon dioxide. The water formed by the reaction was allowed to distill off through an 18 inch Hempel column. The reaction was then continued an additional 8 hours at 180 to 200° C. After this, the reaction mixture was washed with water until acid free. A yield of 141 parts of chloroacetate ester analyzing 6.25% chlorine was obtained.

A mixture of 136 parts of this chloroacetate, 80 parts of potassium thiocyanate, and approximately 160 parts of 95% ethyl alcohol was refluxed for 12 hours. To the resulting mixture there was added approximately 140 parts of petroleum ether, and the mixture obtained was then washed several times with water. The petroleum ether was evaporated under reduced pressure. A yield of 141 parts of product, analyzing 4.25% sulfur, and containing the thiocyanoacetate of the unsaturated alcohol prepared by hydrogenation of the allo-ocimene crotonaldehyde condensate, was thus recovered.

Example 3

A mixture of 25 parts of the unsaturated alcohol prepared by partial hydrogenation of an allo-ocimene crotonaldehyde condensate and 40 parts of alpha-chloropropionic acid was heated under reflux for about 8 hours at 160 to 165° C. with a stream of carbon dioxide passing through the flask and condenser to remove water formed. The reaction mixture was water washed until acid free, and to aid in the separation of the product about 35 parts of petroleum ether were added. After separation from the water, the petroleum ether was removed from the product by evaporation on the reduced pressure. Twenty-nine parts of liquid chloropropionate of the above alcohol, analyzing 6.2% chlorine, was recovered.

A mixture of 22.5 parts of this chloropropionate, 10 parts of commercial sodium thiocyanate, and about 28 parts of 95% ethyl alcohol was refluxed for about 4½ hours. There was added to the reaction mixture about 35 parts of petroleum ether and the resulting mixture was then given 5 water washes, after which a test showing that all inorganic thiocyanate had been removed. The petroleum ether was then removed by evaporation under reduced pressure. A yield of 23 parts of liquid, which analyzed 1.1% chlorine and 4% sulfur, and contained the alpha-thiocyanopropionate of the terpene alcohol initially reacted, was recovered.

Example 4

A mixture of 25 parts of the saturated alcohol prepared by hydrogenation of allo-ocimene crotonaldehyde condensate, 30 parts of alpha-bromo-n-butyric acid was heated under reflux for about 8 hours at 160 to 165° C. with a stream of carbon dioxide passing through the reaction mixture to remove water formed. About 35 parts of petroleum ether was added to the resulting reaction mixture which was then water washed until free of acid. The petroleum ether was removed by evaporation under reduced pressure. A yield of 37 parts of liquid bromobutyrate ester, which analyzed 17.5% bromo, was obtained. A mixture of 34.2 parts of this bromobutyrate, 15 parts of sodium thiocyanate, and about 40 parts by weight of 95% ethyl alcohol was refluxed for about 4½ hours. About 35 parts of petroleum ether was then added and the resulting mixture was washed with water to remove all alcohol and unreacted sodium thiocyanate. The petroleum ether was then evaporated under reduced pressure. A yield of 30.5 parts of liquid alpha-thiocyano-n-butyric acid ester of hydrogenated allo-ocimene crotonaldehyde condensate having a sulfur content of 6.9% was thus obtained.

The products of the examples contain unesterified terpene compounds and petroleum hydrocarbons in varying proportion. A certain portion of the original reactant is usually not esterified and, in addition, there may be some conversion of esters to terpene hydrocarbons in the second stage. The unesterified terpene compounds and petroleum hydrocarbons may be removed by vacuum distillation or vacuum steam distillation if desired. However, such removal is in general of no advantage since the products of this invention are conveniently utilized in diluted form for most purposes and since the diluents mentioned are in most cases colorless and of pleasant or slight odor. Similarly, complete removal of petroleum ether or other inert solvent from the product is usually unnecessary. However, I prefer to remove excess metal thiocyanate, selenocyanate, or tellurocyanate, and any other water soluble material from the product, for example, by thorough washing of a petroleum ether solution with water.

The compounds according to this invention are useful in insecticides. For example, they may be used in kerosene solution in a concentration between about 0.5% and about 20%, with or without other toxic agents such as pyrethrum and rotenone, as contact spray insecticides, or in emulsions, or on solid carriers. The compounds are also useful as flotation agents in the concentration of minerals. They may also be used as intermediates for the preparation of other compounds, such as, for example, wetting agents by treatment with an oxidation agent such as nitric acids. Many of the compounds possess wetting power without modification.

The term "aromatic" as used herein includes any radical containing a benzene linkage in its structure.

This application is a continuation-in-part of my previous application, Serial No. 198,687, filed March 29, 1938, entitled, "Terpene cyanoacyl compounds and methods of producing same."

It will be understood that the details and examples hereinbefore set forth are illustrative only, and that the invention as broadly described and claimed is in no way limited thereby.

What I claim and desire to protect by Letters Patent is:

1. A terpene compound having the type formula ROOCR'XCN in which R is a radical of a reduced allo-ocimene crotonaldehyde condensate, in which R' is a radical selected from the group consisting of aliphatic radicals and aromatic radicals, and in which X is a member of the group consisting of sulfur, selenium, and tellurium.

2. A terpene compound having the type formula ROOCR'SCN in which R is a radical of a reduced allo-ocimene crotonaldehyde condensate and in which R' is a radical selected from the group consisting of aliphatic radicals and aromatic radicals.

3. A terpene compound having the type formula ROOCR'SCN in which R is a radical of a reduced allo-ocimene crotonaldehyde condensate and in which R' is an aliphatic radical.

4. A thiocyanoacetate of a reduced allo-ocimene crotonaldehyde condensate.

5. A thiocyanopropionate of a reduced allo-ocimene crotonaldehyde condensate.

6. A thiocyanobutyrate of a reduced allo-ocimene crotonaldehyde condensate.

7. A thiocyanoacetate of a reduced saturated allo-ocimene crotonaldehyde condensate.

8. A thiocyanopropionate of a reduced saturated allo-ocimene crotonaldehyde condensate.

9. A thiocyanobutyrate of a reduced saturated allo-ocimene crotonaldehyde condensate.

10. A method for the production of the terpene compound described in claim 1 which consists of reacting a reduced allo-ocimene crotonaldehyde condensate with a suitable halogen substituted acylating agent and then with a compound selected from the group of metal thiocyanates, metal selenocyanates, and metal tellurocyanates which are at least partially soluble in the reaction mixture.

11. A method for the production of the terpene compound described in claim 1 which consists of reacting reduced allo-ocimene crotonaldehyde condensate with a halogenated aliphatic carboxylic acid and then with a metal thiocyanate which is at least partially soluble in the reaction mixture.

12. A method for the production of the terpene compound described in claim 1 which consists of reacting a reduced allo-ocimene crotonaldehyde condensate with a halogenated aliphatic carboxylic acid anhydride and then with a metal thiocyanate which is at least partially soluble in the reaction mixture.

13. A method for the production of the terpene compound described in claim 1 which consists of reacting a reduced allo-ocimene crotonaldehyde condensate with a halogen substituted aliphatic acyl halide and then with a metal thiocyanate which is at least partially soluble in the reaction mixture.

14. A method for the production of the terpene compound described in claim 1 which consists of reacting a reduced allo-ocimene crotonaldehyde condensate, with a chlorinated lower fatty acid and then with an alkali metal thiocyanate.

15. A method for the production of the terpene compound described in claim 1 which consists of reacting a reduced allo-ocimene crotonaldehyde condensate with a brominated lower fatty acid and then with an alkali metal thiocyanate.

JOSEPH N. BORGLIN.